United States Patent
Belt et al.

(10) Patent No.: US 8,847,956 B2
(45) Date of Patent: Sep. 30, 2014

(54) METHOD AND APPARATUS FOR MODIFYING A DIGITAL IMAGE

(75) Inventors: Harm Jan Willem Belt, Eindhoven (NL); Cornelis Pieter Janse, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 320 days.

(21) Appl. No.: 12/920,132

(22) PCT Filed: Mar. 3, 2009

(86) PCT No.: PCT/IB2009/050843
§ 371 (c)(1),
(2), (4) Date: Aug. 30, 2010

(87) PCT Pub. No.: WO2009/112967
PCT Pub. Date: Sep. 17, 2009

(65) Prior Publication Data
US 2011/0007073 A1    Jan. 13, 2011

(30) Foreign Application Priority Data
Mar. 10, 2008 (EP) ...................................... 08152535

(51) Int. Cl.
*G06T 15/50* (2011.01)
*G06T 15/60* (2006.01)
*H04N 7/14* (2006.01)
*G06T 15/20* (2011.01)
*H04N 5/272* (2006.01)

(52) U.S. Cl.
CPC ............... *G06T 15/60* (2013.01); *H04N 7/142* (2013.01); *G06T 15/20* (2013.01); *H04N 5/272* (2013.01)

USPC ........................... 345/426; 345/418; 345/419

(58) Field of Classification Search
None
See application file for complete search history.

(56) References Cited

U.S. PATENT DOCUMENTS

| | | | |
|---|---|---|---|
| 5,737,031 A * | 4/1998 | Tzidon et al. | 348/587 |
| 6,288,753 B1 * | 9/2001 | DeNicola et al. | 348/586 |
| 6,530,662 B1 * | 3/2003 | Haseltine et al. | 353/5 |
| 6,980,697 B1 * | 12/2005 | Basso et al. | 382/274 |
| 7,231,099 B1 | 6/2007 | Basso et al. | |
| 7,274,365 B1 | 9/2007 | Dunn | |
| 7,530,019 B2 * | 5/2009 | Kjeldsen et al. | 715/730 |
| 7,574,043 B2 | 8/2009 | Porikli | |
| 2005/0140776 A1 * | 6/2005 | Kurzweil | 348/14.01 |
| 2008/0211813 A1 * | 9/2008 | Jamwal et al. | 345/426 |

FOREIGN PATENT DOCUMENTS

| | | |
|---|---|---|
| GB | 2267409 A | 12/1993 |
| JP | 2004021388 A | 1/2004 |
| JP | 2005078313 A | 3/2005 |
| WO | 2007000938 A2 | 1/2007 |

OTHER PUBLICATIONS

Apperley et al., Use of Video Shadow for Small Group Interaction Awareness on a Large Interactive Display Surface, Conferences in Research and Practice in Information Technology, vol. 18 (2002).*
Stauder, J.: "Augmented Reality With Automatic Illumication Control Incorporating Ellipsoidal Models"; IEEE Transactions on Multimedia, vol. 1, No. 2, Jun. 1999, pp. 136-143.

(Continued)

*Primary Examiner* — James A Thompson

(57) ABSTRACT

A digital image (110) which is displayed to a user (118) is modified to include an aspect (120) of a detected at least one characteristic of the user (118) to give the user (118) the impression that the user (118) is present within the scene displayed by the digital image (110).

12 Claims, 6 Drawing Sheets

(56) References Cited

OTHER PUBLICATIONS

Miwa et al: "Shadow Communication: System For Embodied Interaction With Remote Partners"; Nov. 2004, vol. 6, Issue 3, pp. 467-476.

Apperley et al: "Use of Video Shadow for Small Group Interaction Awareness on a Large Interactive Display Surface"; Proceedings of Australasian User Interface Conference (AUIC2003), Feb. 2003, pp. 81-90.

* cited by examiner

METHOD AND APPARATUS FOR MODIFYING A DIGITAL IMAGE

FIELD OF THE INVENTION

The present invention relates to a method and apparatus for modifying a digital image.

BACKGROUND TO THE INVENTION

Many techniques have been developed to improve the quality of digital imaging. In particular, techniques have been developed to make the imaging more real and less 2-dimensional. One known technique is to add shadows or shading generated by light sources. Numerous techniques have been developed, for example, as disclosed by GB2267409 and the paper IEEE Transactions on multimedia, vol. 1, No. 2, June 1999 "Augmented Reality with Automatic Illumination Control Incorporating Ellipsoidal Models" Jürgen Stauder.

However, these techniques do not go far enough. There is an increasing demand by users to feel more immersed in what they are viewing "as if they are there", particularly in interactive systems such as video telephony.

With the growing amount of people having access to broadband Internet, voice over IP (VoIP) applications are being used more and more and Internet video telephony will be more widely available.

Much of the research to date in this area has focused on improving the audiovisual quality of video telephony by signal processing means. To date high audiovisual quality and low communication delay has been recognized as key for large-scale breakthrough of video telephony.

Even with perfect audiovisual quality, even with 3D images on a very large screen with 3D sound, and with minimal communication delay, there are fundamental differences between mediated person-to-person communication (video telephony) and person-to-person communication at the same place. One such aspect concerns the fact that if you are in a room with someone else, you influence the lighting conditions in the room by your very presence: depending on the location of light sources you create a shadow on walls and/or on the person with whom you are talking. With video telephony you do not influence the lighting conditions in the other room, and therefore there is not a feeling of "as if you are there" even with the highest audiovisual quality.

SUMMARY OF INVENTION

The present invention seeks to provide a system, which displays a scene in an image and gives the viewer the perception that they are present within the scene whilst they are viewing it.

This is achieved, according to an aspect of the invention, by a method of modifying a digital image being displayed to a user, the method comprising the steps of: detecting at least one characteristic of a user viewing a scene displayed by a digital image; modifying the digital image to include an aspect of the detected at least one characteristic to give the user the impression that the user is present within the scene displayed by the digital image.

This is also achieved, according to another aspect of the invention, by an apparatus for modifying a digital image being displayed to a user, the apparatus comprising: detecting means for detecting at least one characteristic of a user viewing a scene displayed by a digital image; and processing means for modifying the digital image to include an aspect of the detected at least one characteristic to give the user the impression that the user is present within the scene displayed by the digital image.

In an embodiment, the at least one characteristic of the user is at least one selected from: location of the user; silhouette of the user; viewpoint of the user. The aspect may be a shadow.

In this way the user viewing the scene sees their shadow in the scene giving them a feeling of being there and increased immersion within the scene whilst viewing it.

This effect may be achieved by providing a virtual light source in the vicinity of the user; determining a shadow of the user cast by the virtual light source; modifying a digital image being displayed to the viewer by adding the determined shadow to the digital image.

The digital image may be modified by determining whether or not each pixel of the digital image is within a region of the determined shadow; and then modifying the luminance of the pixel if it is determined that it is within the region of the determined shadow.

In an embodiment movement of the user is taken into account and the aspect is adjusted on the basis of this movement; and the digital image is modified to include the adjusted aspect. For example, the movement of the user is taken into account by modifying the image for any changes in a characteristic such as the silhouette of the user.

In this way the modified digital image maintains realism of the user being present within the scene whilst viewing it.

To increase the realism, depth information of objects within the scene may be determined and the digital image may include adjusting the aspect on the basis of the depth information.

The digital image may be a video image, which comprises a plurality of frames of the digital image, and the step of modifying the digital image includes modifying the image of each frame.

The aspects of the invention may be included in video telephony in which a digital image is generated at a far-side site and transmitted via an audio-visual communication link for display at a nearside site. The nearside site is remote from the far-side site. To improve the realism for the user at the nearside site, and, possibly, also improve realism for the user at the far-side site to being in a face-to-face communication, at least one characteristic of an object at the far-side site included within the scene of the digital image is detected and the digital image to include an aspect of the at least one characteristic within the digital image.

According to yet another aspect of the invention, there is provided a system for transmitting a digital image having associated audio from a far-side site to a nearside site, the system comprising: an audio-visual communication link between a far-side site and a nearside site; means for generating a digital image at the far-side site; transmitting means for transmitting the generated digital image to the nearside site via the audio-visual communication link; a virtual light source located at the nearside site; processing means for determining a shadow of a user at the nearside site cast by the virtual light source and modifying the transmitted digital image by adding the determined virtual shadow to the transmitted digital image; and display means for displaying the modified digital image to the user.

The processing means may further determine a shadow cast by at least one object at the far-side site within the scene of the generated digital image cast by the virtual light source and modifying the digital image to include the determined shadow.

BRIEF DESCRIPTION OF DRAWINGS

For a more complete understanding of the present invention, reference is now made to the following description taken in conjunction with the accompanying drawings in which.

DETAILED DESCRIPTION OF EMBODIMENTS OF THE INVENTION

Figure 1A:
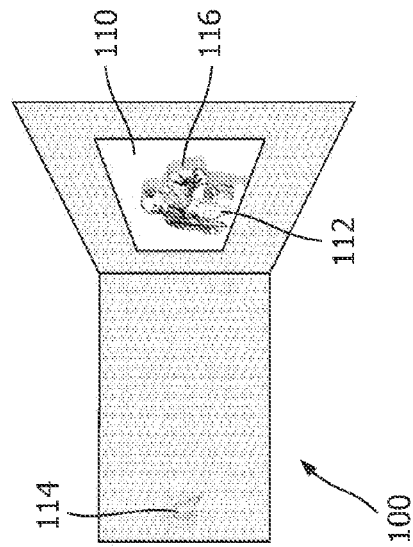
FIGS. 1a-d show a simple schematic of a nearside site (room) with display in a video telephony application incorporating an embodiment of the invention.
Figure 1B:
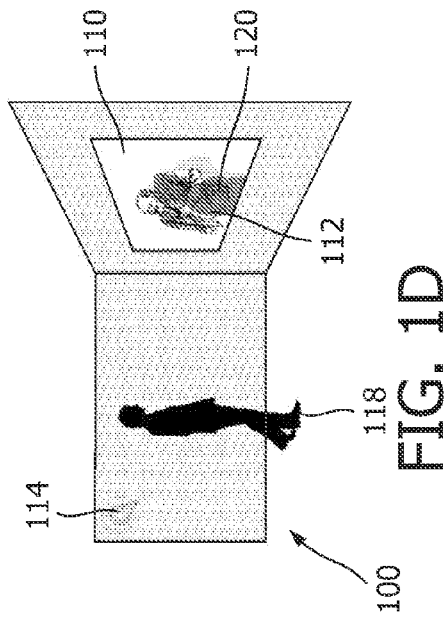
Figure 1C:
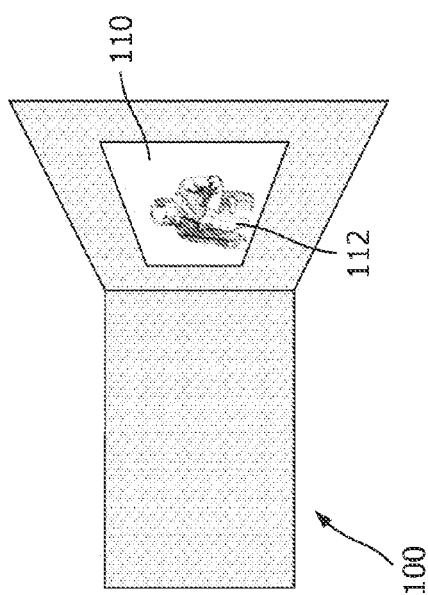
Figure 1D:
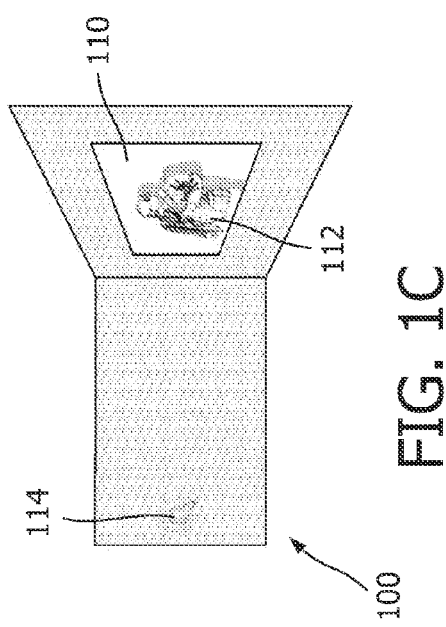

An example of an application of the invention is shown in the figures. With reference to FIG. 1a, an empty nearside room (or site) 100 is shown including a display 110, which displays an image of a far-side user 112 of a video telephony system. As shown in FIG. 1b a virtual light source 114 is provided at the nearside site 100 (within the nearside room). From the location of the far-side user 112 with respect to the environment at the far-side site, the location of the light source 114 and the viewpoint of a nearside user, a virtual shadow 116 of the far-side user 112 is calculated and added to the image received and displayed at the nearside site 100 such that it appears that the far-side user is at the nearside site 100 and effected by the virtual light source 114. FIG. 1c illustrates the effect of moving the virtual light source 114 at the nearside site 100, which causes a change in the virtual shadow 116. FIG. 1d illustrates the effect of a nearside user 118 at the nearside site located between the virtual light source 114 and the display 110. The virtual shadow cast by the nearside user 118 is added to the display 110 seen by the nearside user 118. The virtual shadow 116 of the far-side user 112 is shown on the wall behind him/her.

At least one camera is placed at a fixed, predetermined location near the display 110 at the nearside site 100, and from the camera video signal the location of the nearside user 118 is calculated. From this information a virtual shadow 120 of the nearside user 118 casts by the virtual light source 114 is determined. The virtual shadow 120 of the nearside user 118 is added to the displayed image and shadow on the far-side user 112 and on the wall behind him/her. To calculate the shadows the position of the virtual light source 114 at the nearside site 100, the depth positions of the users 112, 118 at both sides relative to the display 110, and the depth position of the wall at the far-side site, is taken into account as explained below.

The shadow calculations occur in real-time at the nearside site 100, and are only visible to the nearside user 118. By seeing his/her shadow in the other room, an improved sense of presence is created for the nearside user. To make the effect more natural, the shadow 116 of the far-side user 112 is also provided in the image.

Figure 2A:
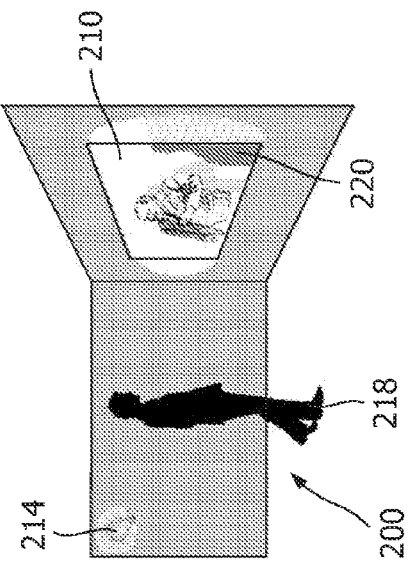
FIGS. 2a-c show a simple schematic of a nearside site with display in a video telephony application showing variation of "Ambilight" operation in a further embodiment of the present invention.
Figure 2B:
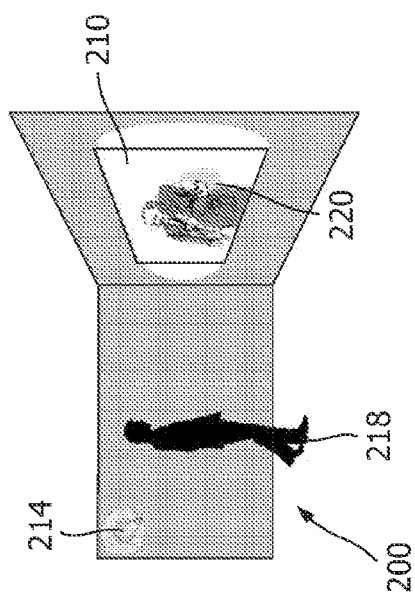
Figure 2C:
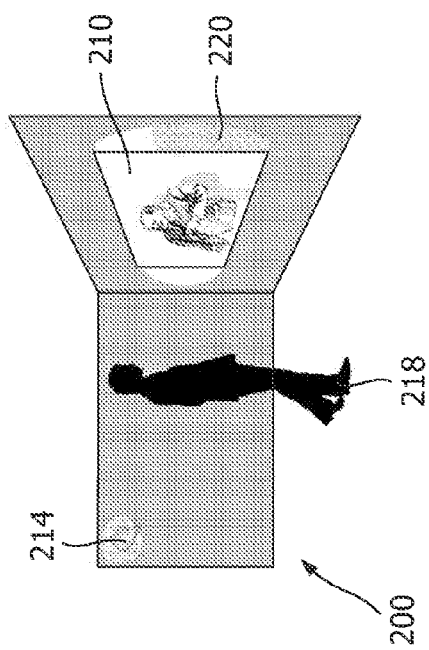

FIGS. 2a-c illustrates the effect of additional light sources mounted inside a display screen that project light on a wall such as that provided by Ambilight TV, which could be used in a display provided on an ambilight television set. The nearside room 200 incorporates an ambilight television which generates the colour and intensity of its ambilights from an analysis of the video content, in such a way that the light impressions on the screen are extended on the wall in a perceptually pleasant way. The result is an increase sense of 'immersiveness'. According to the embodiment, calculation of the ambi-light settings the image of the nearside user 218 as recorded by a camera (not shown) mounted at a known position inside or near the display 210. The shadow impression 220 casts by the virtual light source 214 extend beyond the display 210.

Figure 3:
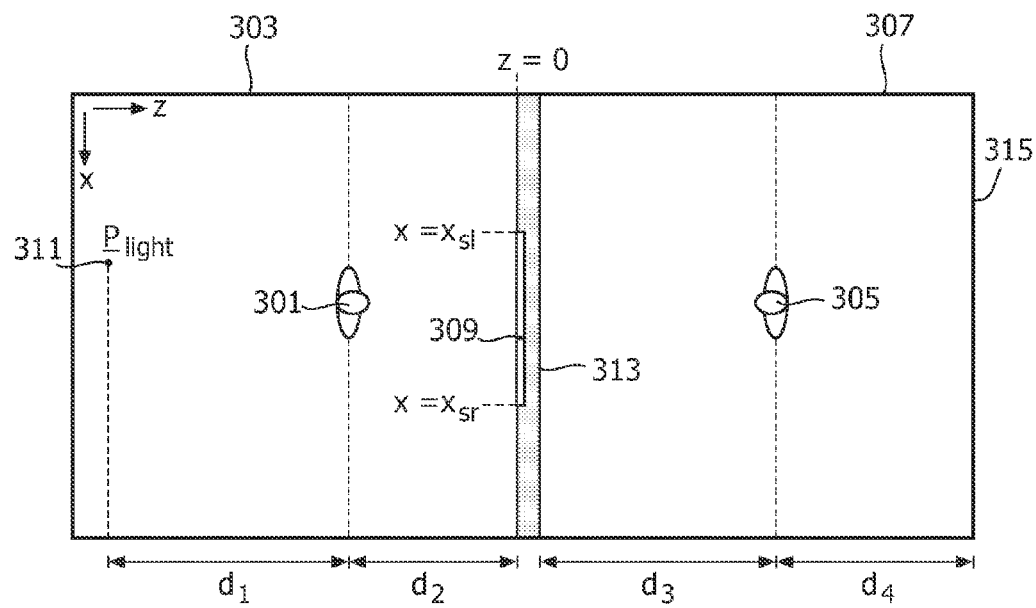
FIG. 3 is a simple plan view of a video telephony system of an embodiment of the present invention, in use.

With reference to FIGS. 3 to 7, the method of determining the virtual shadows is described. In the example of video telephony a nearside user 301 in a nearside site 303 communicates with a far-side user 305 at a far-side site 307 via an audio-visual communication link. The far-side site 307 is remote from the nearside site 303 and not as shown in FIG. 3. Each user 301, 305 has a display 309, 313. The distance $d_2$ of the nearside user 301 from the display 309 is determined from a camera located near the display 309. The camera detects movement of the nearside user 301 and hence changes in $d_2$. A virtual light source 311 is provided behind the nearside user 301 at the nearside site 303 such that the nearside user 301 is located between the display 309 and the virtual light source 311. The exact location of the virtual light source 311 is known and hence from the determined location of the nearside user 301, the distance $d_1$ is determined. Similarly, from a camera located near the display 313 at the far-side site 307, the location of the far-side user 305 is determined and hence the distance $d_3$ of the far-side user 305 from the far-side display 313 is determined. Further the location of a wall 315 behind the far-side user 305 is determined by the camera and hence the distance $d_4$ of the far-side user 305 from the wall 315 is determined.

It can be appreciated that a virtual light source may also be provided at the far-side site 307 to provide a similar effect to the far-side user 305. For simplicity, the embodiment is described with reference to the effect being seen by the nearside user 301. Therefore, for the explanation of the embodiment, the nearside site receives an audiovisual signal from the far-side site, and for this reason is henceforth considered as the receive end of the communication set-up. The far-side site consequently is the transmit end.

As shown in FIG. 3, the sites are defined in terms of a coordinate system in which the coordinates x, y, z are real (so continuous-valued) numbers. The wall between both rooms (sites) is the plane for which z=0 (the wall is depicted at a certain thickness but is considered infinitely thin for the purposes of the explanation here). The location of the virtual light source is indicated by the vector $p_{light}=(x_{light}, y_{light}, z_{light})^t$, where $(\cdot)^t$ denotes a vector transpose, and this location is chosen once and then fixed. The distances $d_1$ through $d_4$ along the z-direction, and the left and right x-coordinates of the screen $x_{sl}$ and $x_{sr}$ and the top and bottom y-coordinates of the screen are $y_{st}$ and $y_{sb}$, respectively ($y_{st}$ and $y_{sb}$ are not shown in FIG. 3).

Figure 4:
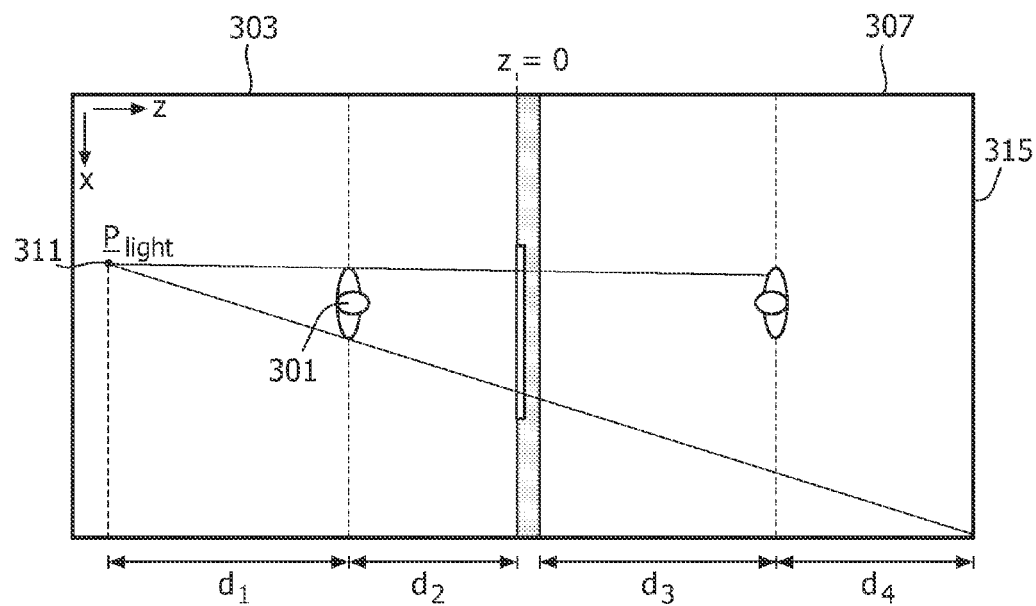
FIG. 4 illustrates the virtual light source and its shadow range in the arrangement of FIG. 3.

FIG. 4 illustrates how the virtual light source 311 creates a shadow at the far-side site 307 caused by the nearside user 301 and the nearside (virtual) light source 311. For the purposes of this explanation, the display is replaced by a hole in the wall connecting the nearside site 303 and the far-side site 307.

The shadow 319 casts is virtual and added to the displayed image by digital video processing of the appropriate image pixels so that it is visible only at the nearside site 303.

Figure 5:
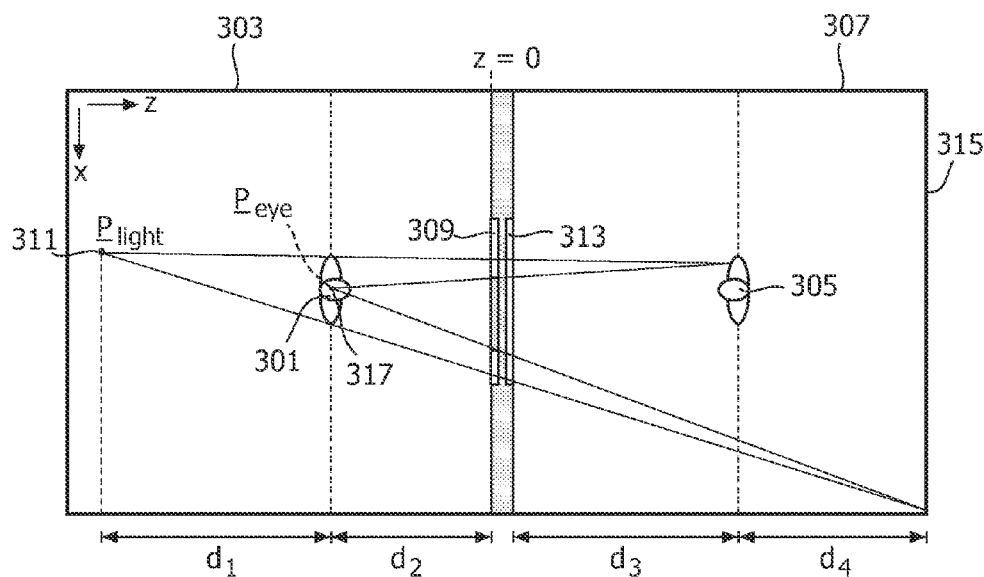
FIG. 5 illustrates the virtual shadow in the far-side site as perceived by the nearside user.

To create the virtual shadow, it is determined which image pixel values have to be modified. To do this the viewpoint 317 of the nearside user 301 is taken into account as shown in FIG. 5. Knowing the 3D positions of the virtual light source 311, of the nearside user's body 301, of the nearside user's viewpoint 317 ($p_{eye}$) of the display 309, of the far-side user's body 305, and of the far-side background (the wall 315), the pixels in the display image that should be modified to show the shadow can be calculated.

When there are multiple nearside users then there are multiple viewpoints. In principle, from each different viewpoint the shadow rendered on the display should be different. This can be done with multi-view displays, for example based on a lenticular lens design, or based on a barrier design. The perceptual importance of the shadow effect lies mostly in the concept that the shadow of the user in the nearside room moves in correspondence with the motion of that same person. However, having a different shadow rendered for each different viewpoint is less important perceptually. Therefore, rendering of multi-viewpoints can be neglected and only one shadow need be computed. As a result, it suffices to use a normal 2D display.

As a result it is not necessary to take into account the precise viewpoint of a nearside user. Therefore, only the viewpoint distance value $d_2$ is required and the viewpoint angle is set to 90 degrees (perpendicular to the display). Alternatively, a precise knowledge of the viewpoint location of the nearside user may be taken into account. To simplify the calculation a good approximation of the nearside viewpoint localization is made as follows: $d_2$ is set to a fixed value. Next a well-known face detection algorithm is used such as that disclosed by P. Viola and M. J. Jones, "Robust real-time face detection," International Journal of Computer Vision, vol. 57, no. 2, pp. 137-154, 2004, to find a rectangular face region in the camera image. The centre of this region is then taken as the angle towards the nearside user viewpoint.

Figure 6:
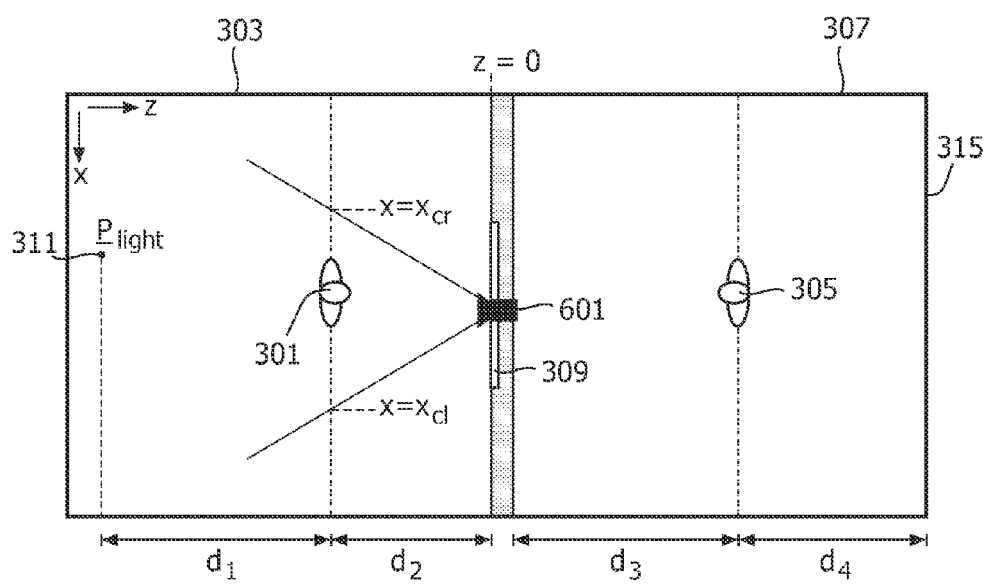
FIG. 6 shows the camera arrangements in the nearside site of the embodiment of FIG. 3.
Figure 7:
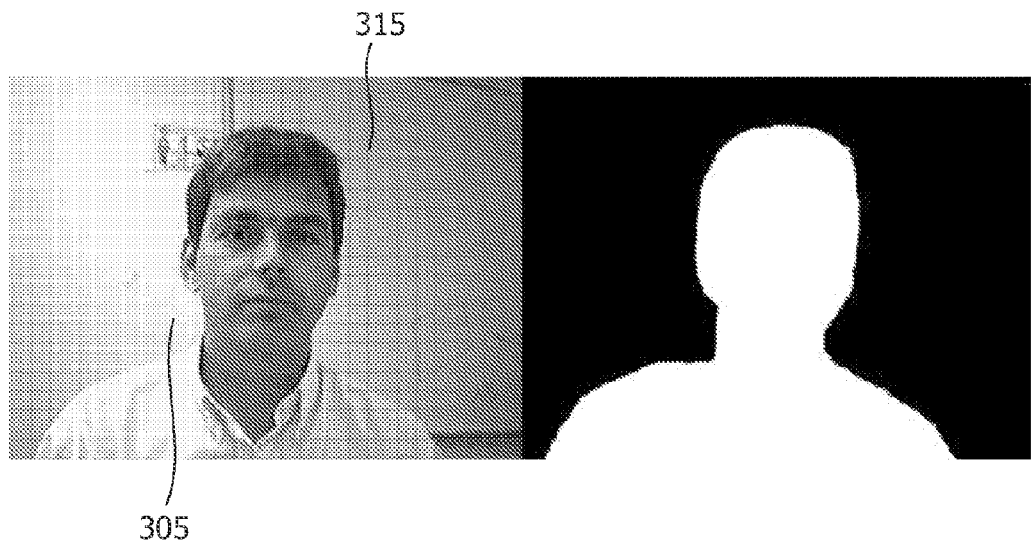
FIG. 7a illustrates an example of a far-side image.
FIG. 7b illustrates the result of segmentation of the image of FIG. 7a according to an embodiment in the invention.

Next, in real-time, a map of the space that the nearside user occupies in the 3D environment is measured. This simplified to a 2D segmentation map. The camera 601 mounted at a fixed and known position near the display is used, as indicated in FIG. 6, where, for computational simplicity, the camera has been aligned with the vertical centre line of the display.

From the camera sequence the nearside segmentation mask is achieved using one of the known image object segmentation techniques that are based on the knowledge that the background object (i.e. the room) is stationary and the foreground object (i.e. the user) is non-stationary. One such technique is known in the literature as background subtraction, see for example, P Noriega and O Bernier, "Real Time Illumination Invariant Background Subtraction Using Local Kernel Histograms," British Machine Vision Conference BMVC06 (III:979).

The near-end segmentation map (or image) is denoted by $$D_{ne}(c,r) \text{ with } c\in[0,W_{ne}-1], r\in[0,H_{ne}-1] \tag{1}$$

where c and r are the integer column and row indices respectively, and $W_{ne}$ and $H_{ne}$ are the respective horizontal and vertical pixel amounts of the near-end segmentation image. $D_{ne}(c,r)$ has non-zero values only at locations where in the camera image the nearside user was detected. In the situation depicted in FIG. 6 a non-zero $D_{ne}(c,r)$ corresponds with an object in the nearside site at distance $d_2$ from the display, i.e. detects the silhouette of the user 301. If the distance $d_2$ is unknown, this is fixed it to some value depending on a priori knowledge of the geometry of the scene for a given application. The precision of $d_2$ is not critical.

Also from the far-side site, next to the normal received image data, a segmentation image is needed at every image frame period. This segmentation mask is either calculated at the transmit end and sent to the other side, or it is calculated from the incoming video at the receive end (using for example background subtraction), an example is presented in FIGS. 7 a and b. Preferably "depth-plus-image" picture at every frame period is received, so that $d_3$ and $d_4$ are known. Alternatively, segmentation of the image and simply pre-defining $d_3$ and $d_4$ to some fixed values that are based on a priori knowledge of the geometry of the application can be used.

The far-side luminance image shown on the display 309 at the nearside site 303 is denoted by $$I_{fe}(c,r) \text{ with } c\in[0,W_{fe}-1], r\in[0,H_{fe}-1], \tag{2}$$

and the corresponding segmentation map (or image) is denoted by $$D_{fe}(c,r) \text{ with } c\in[0,W_{fe}-1], r\in[0,H_{fe}-1], \tag{3}$$

where again c and r are the integer column and row indices respectively. $W_{fe}$ and $H_{fe}$ are the respective horizontal and vertical pixel amounts of the far-end image and the segmentation map. $D_{fe}(c,r)$ has non-zero values at locations where in the camera image the near-end person was detected, and zero values for the background (the wall), see FIG. 7 on the right. In the situation depicted in FIG. 6, a non-zero $D_{fe}(c,r)$ corresponds with an object in the far-end room at distance $d_3$ from the display plane z=0, and a zero $D_{fe}(c,r)$ corresponds with an object (the wall) at distance $d_3+d_4$ from the display plane z=0.

Next the desired shadow effect in the image shown on the screen at the nearside site is calculated.

Each row of pixels in the image is scanned to determine whether or not each pixel in the row is a shadow pixel. If it is not a shadow pixel then the luminance $I_{fe}(c,r)$ is unchanged. If it is a shadow pixel the luminance $I_{fe}(c,r)$ is modified according to $$\tilde{I}_{fe}(c,r) = \max\{I_{fe}(c,r)-s, 0\}, \tag{4}$$

where s is a number that reflects the desired drop in luminance due to the shadow. For most realism s is chosen to depend on all geometry parameters of the scene so that the shadow intensity changes depending on the distances between the virtual light source, the nearside and far-side users, and the far-side wall. For simplicity, but still providing a realistic effect s may be chosen to be a small constant number $s=s_{fe}$ when the shadow comes from the far-side user and a slightly larger constant number $s=s_{ne}$ when the shadow comes from the nearside user.

To determine whether or not a pixel in the far-side image is a shadow pixel, the pixel at the $c_1$-th column and $r_1$-th row in the far-side image $I_{fe}(c,r)$ is considered and the corresponding location in the (x,y,z)-coordinate system is calculated. This location is denoted by the vector $a_1$, which is calculated as $$a_1 = (x_{a1}, y_{a1}, 0)^t, \quad x_{a1} = |x_{sr} - x_{sl}|\frac{c_1}{W_{fe}-1} + x_{sl}, \tag{5}$$

$$y_{a1} = |y_{sb} - y_{st}|\frac{r_1}{H_{fe}-1} + y_{st}.$$

Here $|\cdot|$ means the absolute value. In the example situation of FIG. 8 the depth map $D_{fe}(c,r)$ is zero at $(c_1,r_1)$, so that it is determined to be a pixel that corresponds to the background (the wall) in the far-end room). Then the site coordinate of point $a_2$ as the intersection of the line running through $p_{eye}$ and $a_1$ with the plane $z=d_3+d_4$ (which is the far-end wall) is calculated, by solving the following set of three linear equations with three unknowns $\kappa$, $\lambda$, and $\mu$:

$$\underline{p}_{eye} + \kappa(\underline{a}_1 - \underline{p}_{eye}) = \begin{pmatrix} 0 \\ 0 \\ d_3+d_4 \end{pmatrix} + \lambda \begin{pmatrix} 1 \\ 0 \\ 0 \end{pmatrix} + \mu \begin{pmatrix} 0 \\ 1 \\ 0 \end{pmatrix}. \tag{6}$$

When the solved unknowns in (6) are denoted by $\kappa_o$, $\lambda_o$ and $\mu_o$, then $a_2$ is given by $$\underline{a}_2 = \underline{p}_{eye} + \kappa_o(\underline{a}_1 - \underline{p}_{eye}) = \begin{pmatrix} 0 \\ 0 \\ d_3+d_4 \end{pmatrix} + \lambda_o \begin{pmatrix} 1 \\ 0 \\ 0 \end{pmatrix} + \mu_o \begin{pmatrix} 0 \\ 1 \\ 0 \end{pmatrix}. \tag{7}$$

Figure 9:
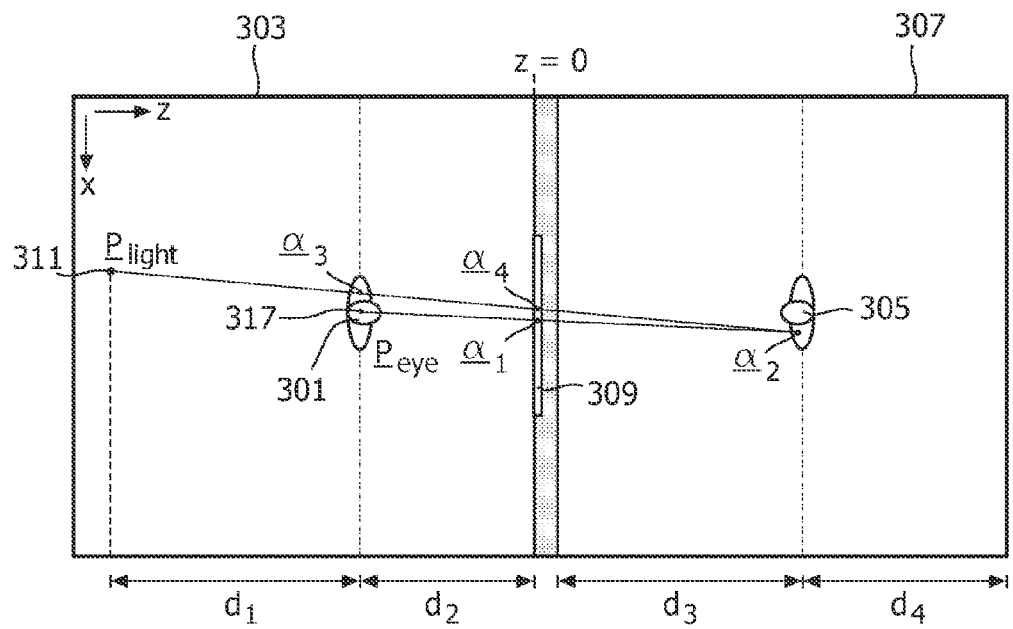
FIG. 9 illustrates another example of verification of whether a pixel of the display is a shadow pixel according to an embodiment of the invention.

In the example situation of FIG. 9, $D_{fe}(c,r)$ is non-zero at $(c_1,r_1)$, and $a_2$ is calculated as the intersection of the line running through $p_{eye}$ and $a_1$ with the plane $z=d_3$. This can be done by setting $d_4=0$ in Equations 6 and 7.

Next it is verified whether or not the line through $a_2$ and $p_{light}$ which crosses the space occupied by the nearside user. The location $a_3$ is calculated as the location of the cross-point of that line with the plane $z=-d_2$, see FIG. 8, arriving at three equations with three unknowns:

$$\underline{p}_{eye} + \varphi(\underline{a}_2 - \underline{p}_{light}) = \begin{pmatrix} 0 \\ 0 \\ -d_2 \end{pmatrix} + \rho \begin{pmatrix} 1 \\ 0 \\ 0 \end{pmatrix} + \sigma \begin{pmatrix} 0 \\ 1 \\ 0 \end{pmatrix}. \tag{8}$$

Solving for $\varphi$, $\rho$, and $\sigma$ gives $\varphi_o$, $\rho_o$, and $\sigma_o$, and $a_3$ becomes $$\underline{a}_3 = \begin{pmatrix} x_{a3} \\ y_{a3} \\ z_{a3} \end{pmatrix} = \underline{p}_{eye} + \varphi_o(\underline{a}_2 - \underline{p}_{light}) = \begin{pmatrix} 0 \\ 0 \\ -d_2 \end{pmatrix} + \rho_o \begin{pmatrix} 1 \\ 0 \\ 0 \end{pmatrix} + \sigma_o \begin{pmatrix} 0 \\ 1 \\ 0 \end{pmatrix}. \tag{9}$$

Now the real-valued elements of $a_3$ from the (x,y,z) coordinate system are translated in (c,r) coordinates for the nearside segmentation mask $D_{ne}(c,r)$, denoted by coordinates by $(c_3,r_3)$. It is assumed that the segmentation image $D_{ne}(c,r)$ lies exactly within the coordinate range $x \in [x_{cr}, x_{cl}]$ and $y \in [y_{ct}, y_{cb}]$ in the vertical image plane defined by $z=-d_2$, see FIG. 6. The coordinates $x_{cl}$ and $x_{cr}$ in FIG. 6 define the utmost left and right image borders captured by the camera. Likewise the (not-depicted) coordinates $y_{ct}$ and $y_{cb}$ define the utmost top and bottom camera image borders, such that $$c_3 = (W_{ne}-1)\left|\frac{x_{a3}-x_{cl}}{x_{cr}-x_{cl}}\right|, \quad \text{and} \quad r_3 = (H_{ne}-1)\left|\frac{y_{a3}-y_{ct}}{y_{cb}-y_{ct}}\right|. \tag{10}$$

The values of $c_3$ and $r_3$ of Equation (10) are real, and are rounded to the nearest integer before being used as image indices. Alternatively, for more accuracy, $c_3$ and $r_3$ are not rounded and a bilinear image interpolation is applied when fetching a pixel value from an image at a non-integer location.

Figure 8:
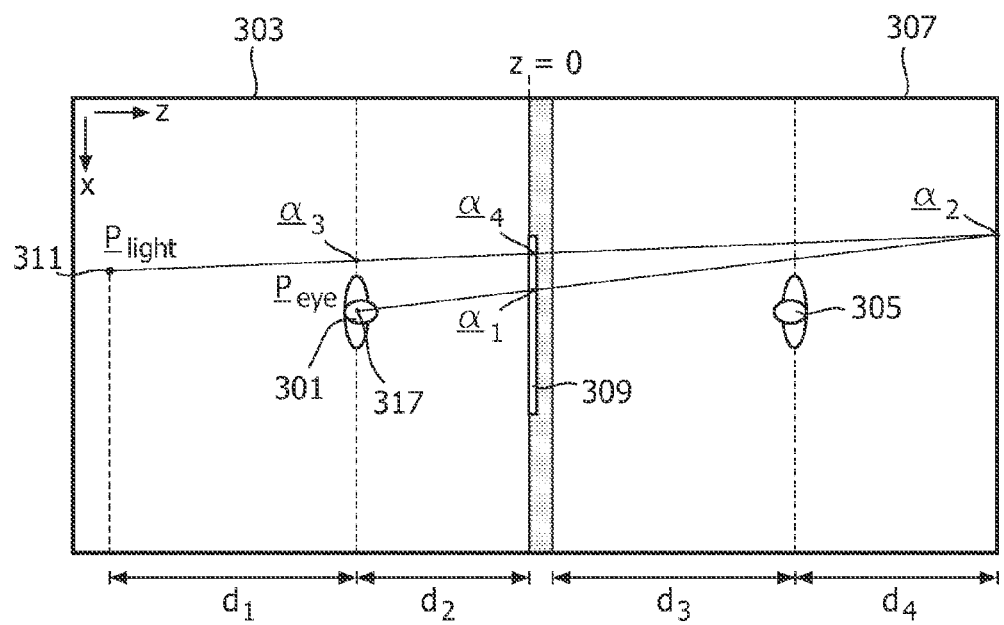
FIG. 8 illustrates an example of verification of whether a pixel of the display is a shadow pixel according to an embodiment of the invention.

In the same way the location of the point $a_4$ is calculated, which is the cross-point of the line through $p_{eye}$ and $a_2$ and the plane $z=0$, see FIG. 8 and FIG. 9. Finally, the corresponding far-side image coordinates $c_4$ and $r_4$ are calculated similar to the method of calculation of $a_3$, $c_3$ and $r_3$.

From these calculations it is now possible to make a decision whether or not a pixel at location $(c_1,r_1)$ in the far-side image $I_{fe}(c,r)$ is a shadow pixel.

A pixel $I_{fe}(c_1,r_1)$ is a nearside user's shadow pixel when $a_3$ coincides with the location of the nearside users, hence when $$D_{ne}(c_3,r_3) \neq 0. \tag{11}$$

A pixel $I_{fe}(c_1,r_1)$ is a far-side user's shadow pixel when three conditions are satisfied, namely it is not a nearside user's shadow pixel, and it is not a pixel belonging to the far-side user (so a2 is a wall pixel), and the line through $p_{eye}$ and $a_2$ intersects with the location of the far-side user. Hence, a pixel $I_{fe}(c_1,r_1)$ is a far-side user's shadow pixel when $$D_{ne}(c_3,r_3)=0, \text{ and } D_{fe}(c_1,r_1)=0, \text{ and } D_{fe}(c_4,r_4) \neq 0. \tag{12}$$

Figure 10:
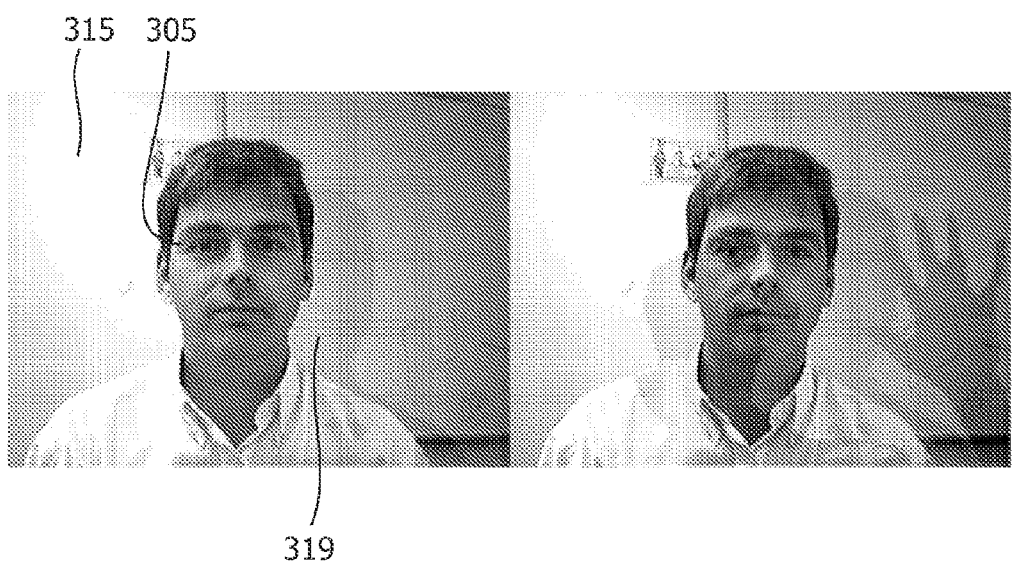
FIG. 10a illustrates a far-side image as seen in the nearside site in which a shadow of the far-side user is added.
FIG. 10b illustrated the far-side image of FIG. 10a as seen in the nearside site in which a shadow of the nearside user is added.

When the condition in Equation (11) is satisfied the shadow constant s in Equation (4) is set to $s=s_{ne}=30$ (assuming image luminance values in the range [0,255]). When the condition in Equation (12) is satisfied $s=s_{ne}=20$ is set. FIG. 10a shows an example where on the left only the virtual shadow of the far-side person is depicted (corresponding to the situation of FIG. 1b or c), and in FIG. 10b on the right both the nearside and far-side person's virtual shadows are shown (corresponding to the situation of FIG. 1d).

Note in FIG. 10b on the right the effect that the shadow of the nearside person head partly falls on the far-side person's face, and that the remaining part of the shadow falls on the wall, where clearly the depth difference between the two far-side objects is taken into account (there is a shift in shadow location). This achieves a more natural effect.

For each time frame, a current silhouette of the user is detected as described above and the corresponding shadow of the current silhouette is determined such that as the user moves, the shadow correspondingly moves.

The invention may be applied in video telephony and video conferencing systems to create a sense of "being there". Alternatively, it may also be applied for the creation of your own shadow in virtual environments (games, Second Life).

The invention may also be used within applications, where the goal is to be able to capture, share, and (re-)live the experience "as if you were there". For the lifelike full-sensory re-creation of recorded experiences, for example watching your holiday movie and whilst the viewer is watching it, their own life shadow is shown in the holiday scene in real time giving them a feeling of being there and increased immersion.

Although embodiment of the present invention have been illustrated in the accompanying drawings and described in the foregoing description, it will be understood that the invention is not limited to the embodiments disclosed but capable of numerous modifications without departing from the scope of the invention as set out in the following claims.

The invention claimed is:

1. A method of modifying a digital image being displayed to a user, the method comprising the steps of:
   detecting at least one characteristic of the user viewing a scene displayed by the digital image, said scene being remotely located from said user;
   modifying the digital image, said modifying comprising:
      incorporating within the scene, an aspect of objects within the scene caused by a virtual light located in a vicinity of the user, said aspect of objects within the scene being positioned within the scene at a distance further from the user than the objects within the scene, and
      incorporating onto the objects and the aspects of the objects within the scene, an aspect of the detected at least one characteristic of the user caused by the virtual light, said aspect of the detected at least one characteristic being positioned on said objects and the aspects of the objects within the scene considering a position of the user with respect to the virtual light; and
   displaying the modified scene to the user, wherein said user appears to be present at said remotely located scene.

2. The method according to claim 1, wherein the at least one characteristic of the user is at least one selected from a group consisting of: location of the user, silhouette of the user, and viewpoint of the user.

3. The method according to claim 1, wherein the aspect of the objects and the aspect of the detected at least one characteristic being a shadow.

4. The method according to claim 3, wherein the step of modifying the digital image includes the steps of:
   determining whether a pixel of the digital image is within a region of the shadow; and
   modifying a luminance of the pixel if it is determined that the pixel is within the region of the determined shadow.

5. The method according to claim 1, wherein the step of detecting at least one characteristic of the user further comprises the step of:
   detecting changes in the at least one characteristic of the user; and
   modifying the digital image to include the aspect of the at least one characteristic adjusted based on the detected changes in the at least one characteristic.

6. The method according to claim 1, wherein the digital image has depth information of objects within the scene and the step of modifying the digital image includes adjusting the aspect of one of the objects and the at least one characteristic based on the depth information.

7. The method according to claim 1 wherein the digital image is a video image comprising a plurality of frames and the step of modifying the digital image includes modifying the image of each frame.

8. A computer program product, stored on a non-transitory medium, said program product comprising a plurality of program code portions, which when loaded into a processor causes the processor to perform the method according to claim 1.

9. An apparatus for modifying a digital image being displayed to a user, the apparatus comprising:
   means for detecting at least one characteristic of the user viewing a scene displayed by the digital image, said scene being remotely located from said user;
   means for modifying the digital image, said modifying comprising:
      incorporating an aspect of objects within the scene caused by a virtual light source in the vicinity of the user, said aspects of objects being positioned within the scene at a distance from the user further than the objects within the scene, and
      incorporating, onto the objects and the aspects of the objects within the scene, an aspect of the detected at least one characteristic of the user caused by the virtual light source, said aspect of the detected at least one characteristic being positioned on said objects and the aspects of the objects within the scene considering a position of the user with respect to the virtual light; and
   means for displaying the modified remotely located scene to the user, wherein said use appears to be present at said remotely located scene.

10. The apparatus according to claim 9, wherein the at least one characteristic of the user is at least one selected from a group consisting of:
   location of the user, a silhouette of the user- and a viewpoint of the user.

11. The apparatus according to claim 9, wherein the aspect of the objects and the aspect of the detected at least one characteristic being a shadow.

12. A system for transmitting and displaying a digital image having associated audio from a far-side site to a near-side site, the system comprising:
   an audio-visual communication link between the far-side site and the nearside site;
   means for generating the digital image at the far-side site;
   means for transmitting the generated digital image to the nearside site via the audio-visual communication link;
   a virtual light source located at the nearside site;
   means for:
      determining a shadow of a user at the nearside site cast by the virtual light source with respect to the image at the far side site;
      determining a shadow of objects in the transmitted image cast by the virtual light source; and
      modifying the transmitted digital image by adding;
      the determined shadow of a user at the nearside onto objects within the transmitted digital image, said shadow of a user being positioned on said objects and said shadow of objects within the scene considering a position of the user with respect to the virtual light; and
      the determined shadow of objects within the transmitted digital image at a distance further from the user than the objects; and
   means for displaying the modified digital image to the nearside site situated user.

* * * * *